United States Patent
Moeller

(10) Patent No.: US 11,312,595 B2
(45) Date of Patent: Apr. 26, 2022

(54) LIFTING DEVICE FOR WIND TURBINE COMPONENTS

(71) Applicant: Siemens Gamesa Renewable Energy A/S, Brande (DK)

(72) Inventor: Jesper Moeller, Brande (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 326 days.

(21) Appl. No.: 16/340,439

(22) PCT Filed: Sep. 12, 2017

(86) PCT No.: PCT/EP2017/072802
§ 371 (c)(1),
(2) Date: Apr. 9, 2019

(87) PCT Pub. No.: WO2018/072927
PCT Pub. Date: Apr. 26, 2018

(65) Prior Publication Data
US 2019/0292020 A1    Sep. 26, 2019

(30) Foreign Application Priority Data

Oct. 20, 2016  (DE) ............... 10 2016 220 628.1

(51) Int. Cl.
| B66C 1/10 | (2006.01) |
| F03D 13/10 | (2016.01) |
| B66C 13/08 | (2006.01) |

(52) U.S. Cl.
CPC ............ B66C 1/108 (2013.01); B66C 13/08 (2013.01); B66C 13/085 (2013.01); F03D 13/10 (2016.05);
(Continued)

(58) Field of Classification Search
CPC ....... B66C 1/108; B66C 13/08; B66C 13/085; F03D 13/10; F05B 2230/61; F05B 2230/604
See application file for complete search history.

(56) References Cited

U.S. PATENT DOCUMENTS

| 2008/0216301 A1 | 9/2008 | Hansen et al. |
| 2009/0025219 A1 | 1/2009 | Hansen et al. |

(Continued)

FOREIGN PATENT DOCUMENTS

| CA | 2611342 A1 | 5/2008 |
| CA | 2956875 A1 | 2/2016 |

(Continued)

OTHER PUBLICATIONS

English translation of DE 20 2014 105459 (submitted as an IDS reference).*

(Continued)

*Primary Examiner* — Moshe Wilensky
(74) *Attorney, Agent, or Firm* — Schmeiser, Olsen & Watts LLP

(57) ABSTRACT

A lifting device for a wind turbine component includes a yoke for connecting the wind turbine component to a crane, the yoke including at least one sensor for measuring the position and/or the speed and/or the acceleration of the wind turbine component at least during a lifting operation of the component is provided. The yoke further includes a pitching device for rotating the wind turbine component around a pitching axis when the wind turbine component is connected to the yoke.
The lifting device further includes a controller for controlling the rotation of the pitching device around the pitching axis as a function of the measurement of the at least one sensor.

10 Claims, 3 Drawing Sheets

(52) U.S. Cl.
CPC ..... *F05B 2230/604* (2013.01); *F05B 2230/61* (2013.01); *Y02E 10/72* (2013.01); *Y02P 70/50* (2015.11)

(56) References Cited

U.S. PATENT DOCUMENTS

| | | |
|---|---|---|
| 2015/0028609 A1 | 1/2015 | Hansen et al. |
| 2017/0233228 A1* | 8/2017 | Coners .................... B66C 13/44 29/889.21 |

FOREIGN PATENT DOCUMENTS

| | | |
|---|---|---|
| CN | 101220798 A | 7/2008 |
| CN | 101230835 | 7/2008 |
| CN | 102135065 A | 7/2011 |
| CN | 104340848 A | 2/2015 |
| DE | 102011121438 A1 | 6/2013 |
| DE | 202014105459 U1 | 2/2016 |
| EP | 1925582 A1 | 5/2008 |
| EP | 2084098 A1 | 8/2009 |

OTHER PUBLICATIONS

Non-English Chinese Office Action for Application No. 201780064925.4, dated Jul. 30, 2020.
PCT International Search Report and Written Opinion of International Searching Authority dated Dec. 19, 2017 corresponding to PCT International Application No. PCT/EP2017/072802 filed Sep. 12, 2017.
Non-English Chinese Office Action for Application No. 201780064925.4, filed Nov. 27, 2019.

* cited by examiner

LIFTING DEVICE FOR WIND TURBINE COMPONENTS

CROSS-REFERENCE TO RELATED APPLICATIONS

This application claims priority to PCT Application No. PCT/EP2017/072802, having a filing date of Sep. 12, 2017, which is based off of German Application No. 10 2016 220 628.1, having a filing date of Oct. 20, 2016, the entire contents both of which are hereby incorporated by reference.

FIELD OF TECHNOLOGY

The following relates to lifting wind turbine components. Particularly, but not exclusively, embodiments of the invention may relate to lifting a blade of a wind turbine during installation of the blade to the rotor of wind turbine.

BACKGROUND

In the technical field of wind turbines installation, each of the blades is lifted by a lifting device to be brought at the same height of the nacelle and hub previously installed on top of the tower of the turbine. The lifting device includes at least a crane and a blade lifting device.

One known first possibility is to lift the blades oriented vertically, with the largest surfaces, i.e. the suction and the pressure sides, exposed directly to the wind. In this orientation the wind presses the blade according to a direction substantially orthogonal to its largest surfaces, causing the blade to move in a horizontal plane during the lifting operations. These movements can be compensated by tack lines connected to the crane boom. However, as a consequence of the fact that wind turbine blades are nowadays becoming bigger and bigger, also the forces applied to the tack lines and therefore transferred to the boom are proportionally increasing. An upper limit exists regarding the maximum forces which can be borne by the tack lines and by the crane boom, meaning that, foe each wind conditions, also a limit for the dimensions of the biggest blade which can be safely lifted exists.
A second possibility is to lift the blades in a horizontal position with the suction and the pressure sides substantially parallel to the ground and the leading and trailing edges of the blade exposed to the wind. In this configuration, under the effect of the wind the blade, being an aerofoil, tends to move in a vertical plane.

Similarly, to the first lifting configuration, a system of wires and winches can be used for preventing the movements of the blades during lifting, as describe in documents EP 1925582 and EP 2084098. In this case the applied compensation forces mainly pull up and down.

In all cases the managing of tack lines, wires and winches implies a plurality of inconveniences, particularly related to the complexity of such systems and to the amplitude of the forces involved.

It is therefore still desirable to have an improved lifting device, in order that wind forces acting on the blades are efficiently compensated independently from the wind intensity and the blade dimensions.

SUMMARY

An aspect relates to provide a lifting device solving the above described inconveniences experimented in known lifting device.

In particular, an aspect relates to provide a lifting device assuring a stable lifting of the blade at higher wind intensities, with respect to the known lifting devices.

A further aspect relates to provide a lifting device assuring a stable lifting of the blade without involving the use of wire systems.

According to a first aspect of embodiments of the present invention, a lifting device for a wind turbine component comprises a yoke for connecting the wind turbine component to a crane, the yoke including at least one sensor for measuring the position and/or the speed and/or the acceleration of the wind turbine component at least during a lifting operation of the component, wherein the yoke further includes a pitching device for rotating the wind turbine component around a pitching axis when the wind turbine component is connected to the yoke, wherein the lifting device further includes a controller for controlling the rotation of the pitching device around the pitching axis as a function of the measurement of the at least one sensor.

According to a second aspect of embodiments of the present invention, a method for lifting a wind turbine component comprising the steps of:
lifting the component,
measuring the position and/or the speed and/or the acceleration of the component during the lifting step,
rotating the wind turbine component around a pitching axis depending on the position and/or the speed and/or the acceleration detected in the step of measuring.

According to embodiments of the present invention, the yoke may include a plurality of sensors for measuring the position and/or the speed and/or the acceleration of at least two points of the wind turbine component. Advantageously this allows compensating both translation and rotation of the blade during installation. At the same time, translation and rotations in different planes may be monitored.

Advantageously, according to a possible embodiment of the present invention, the blade may be lifted in a vertical orientation, with the largest surfaces, i.e. the suction and the pressure sides, exposed directly to the wind. The controller of the lifting system monitors the blade through the sensors and when the blade starts to move excessively in the horizontal plane it commands the pitching device to pitch the blade to generate more aerodynamical load on the blade. This causes the blade to become stable again.

Advantageously, according to another possible embodiment of the present invention, the blade may be lifted in a horizontal orientation, i.e. with the leading and trailing edges exposed directly to the wind. The controller of the lifting system monitors the blade through the sensors and when the blade starts to move excessively in the vertical plane it commands the pitching device to pitch the blade to generate less aerodynamical load on the blade. This causes the blade to become stable again.

BRIEF DESCRIPTION OF THE DRAWINGS

Some of the embodiments will be described in detail, with reference to the following figures, wherein like designations denote like members, wherein.

DETAILED DESCRIPTION

Figure 1:
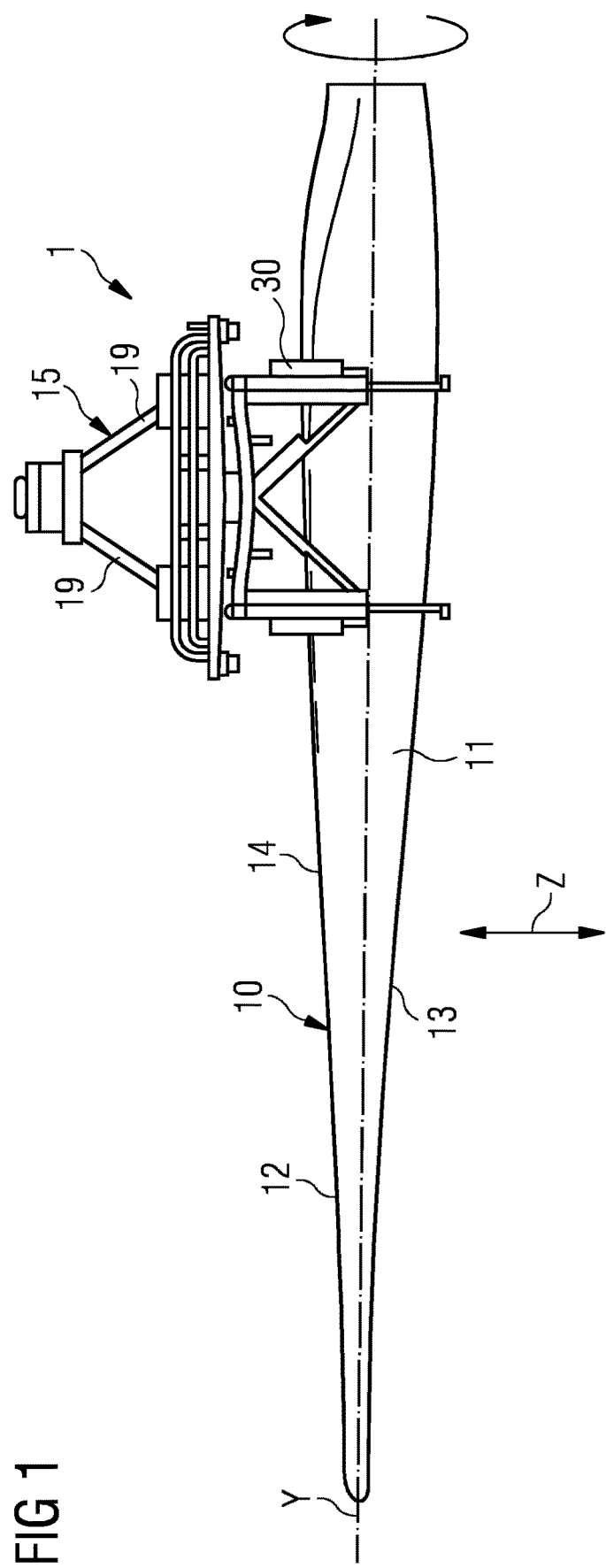
FIG. 1 shows a lateral view of a lifting device according to embodiments of the present invention, in a first operative configuration.

The illustrations in the drawings are schematic. It is noted that in different figures, similar or identical elements are provided with the same reference signs.

Figure 2:
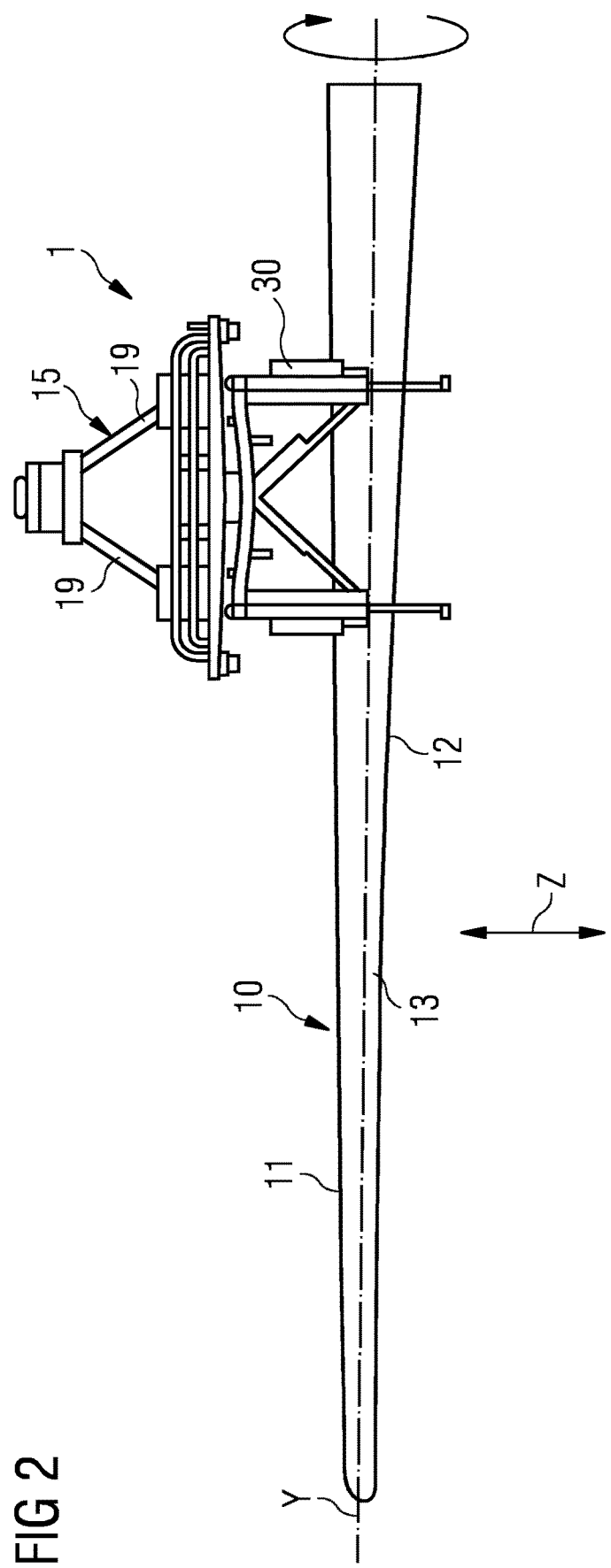
FIG. 2 shows a lateral view of a lifting device according to embodiments of the present invention, in a second operative configuration.
Figure 3:
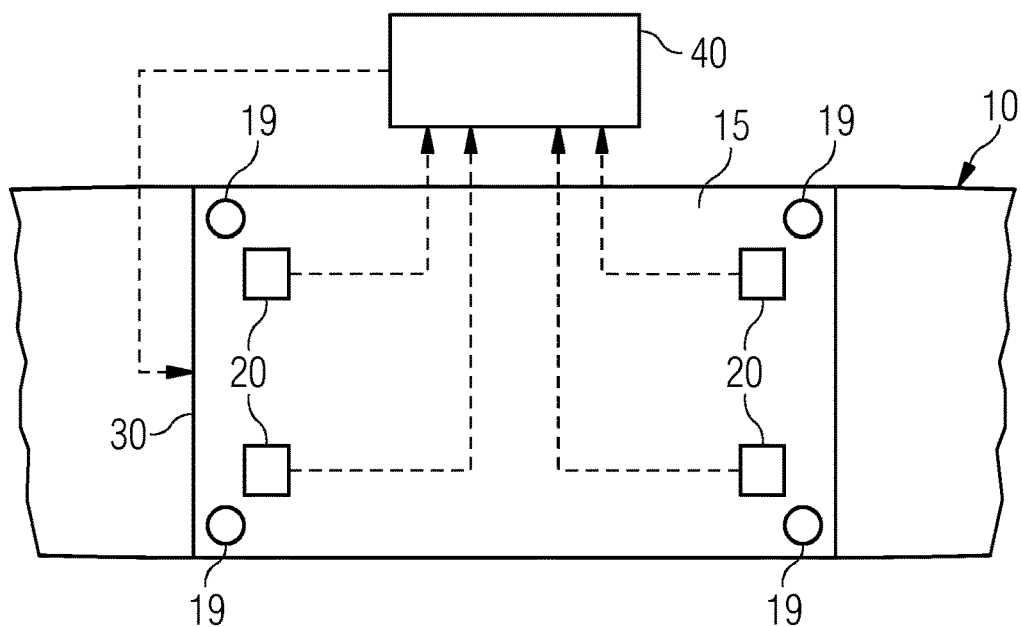
FIG. 3 shows a schematic top view of the lifting device shown in FIG. 1.
Figure 4:
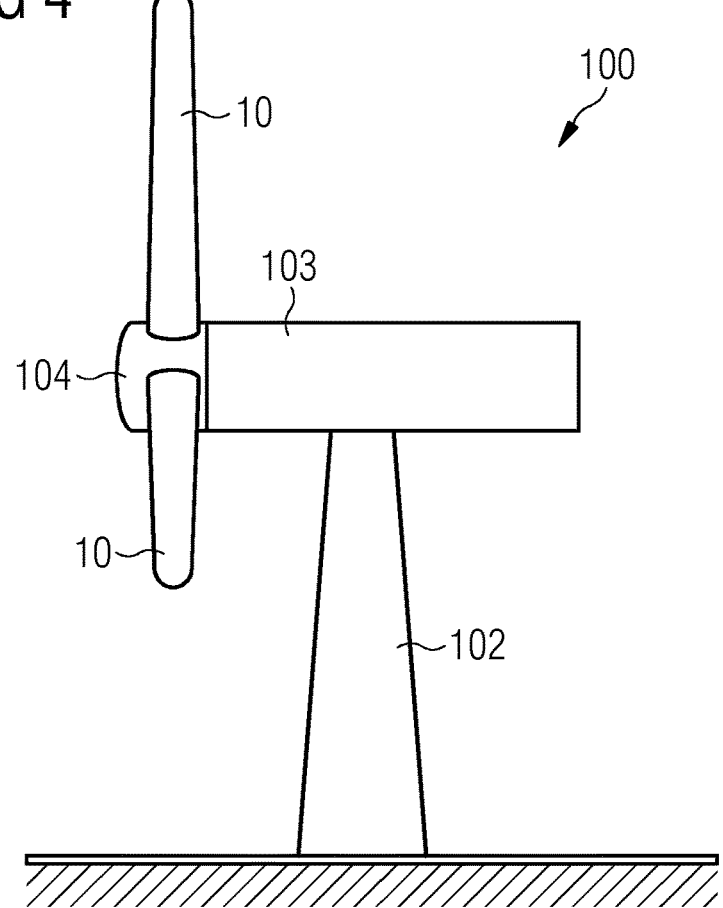
FIG. 4 shows a schematic view of a wind turbine, which can be assembled using the lifting device of embodiments of the present invention.

FIGS. 1 to 3 show a lifting device 1 for a blade 10 of a wind turbine 100 (FIG. 4). The blade 10 extends longitudinally between a base and tip along a pitching axis Y. In operation of the wind turbine 100, i.e. when the wind force acts on the blades causing the rotation of the wind turbine rotor to which the blades are attached, the blade 10 can be rotated around the pitch axis Y to optimally adapt the inclination of the blade 10 and therefore the power generation to the wind condition. Therefore, power generation through a wind turbine is not a specifically issue of embodiments of the present invention and therefore operating the blade 10 when the wind turbine has been already put in service is not described in further detail.

The blade is an aerofoil which includes a suction side 11, a pressure side 12, a leading edge 13 and a trailing edge 14.

The lifting device 1 comprises a joke 15 for connecting the blade 10 to a crane (not represented) through the linking wires 19. With reference to FIG. 4, where an already installed wind turbine 100 is shown, in a conventional sequence of operations for mounting a wind turbine, first a tower 102 for the wind turbine is mounted, then nacelle 103 is connected to the tower and the rotor 104 is connected to the nacelle. Finally, the blades 10 are connected to the rotor 104. For bringing each blade 10 at the level of the rotor, the blade 10 is connected to the yoke 15 with the pitching axis Y substantially oriented according to a horizontal direction and then lifted by a crane, to which the yoke 15 is attached, along a vertical direction Z. As an alternative the pitching axis Y may be inclined during lifting of an angle comprised between 0 and 60 degrees with respect to the horizontal direction.

In the operative configuration of FIG. 1, the blade 10 is oriented vertically, with the largest surfaces, i.e. the suction and the pressure sides 11, 12 exposed directly to the wind.

In the operative configuration of FIG. 2, the blade 10 is oriented horizontally, with the leading edge 13 and/or the trailing edge 14 exposed directly to the wind.

The yoke 15 includes a pitching device 30 for rotating the blade 10 around the pitching axis Y, when the blade 10 is connected to the yoke 15 for being lifted and installed to the rotor 104 of the wind turbine.

The pitching device 30 is capable of rotating the blade 10 between the two lifting configurations of FIG. 1 and FIG. 2. According to embodiments of the present invention, the pitching device 30 may be of any type, provided that it is able to rotate the blade 10 around the pitching axis Y when the blade is connected to the yoke 15, in particular during the lifting operation of the blade 10 to the rotor 104.

According to possible embodiments of the present invention, the pitching device 30 is for example a first mobile portion of the yoke 15 to which the blade 15 is directly attached and which is rotatable with respect to a second fixed portion of the yoke 15, which is directly attached to the crane by means of the wire 19. The mobile and fixed portions of the yoke are configured in such a way that, when the blade 15 is attached to the mobile portion and the mobile portion is rotated with respect to the fixed portion, then the blade 10 is rotated around the pitch axis Y.

The lifting device 1 further includes a controller 40 for controlling the rotation of the pitching device 30 around the pitching axis Y as a function of the measurement of the at least one sensor 20, or a plurality of sensors 20 included in the yoke 15.

Each sensor 20 measures the position and/or the speed and/or the acceleration of the point of the yoke 15 in which they are installed and, as a consequence, of the portion of the blade 10 which is close to the sensor 20 when the blade 10 is attached to the yoke 15. In particular the sensors 20 measure the position and/or the speed and/or the acceleration of the blade 10 during the lifting operation of the blade 10.

The use of at least two sensors 20 in two distanced point may be advantageously used for measuring an angular position and/or angular speed and/or angular acceleration of the blade 10.

The use of a plurality of sensors 20 may be advantageously used for measuring an angular position and/or angular speed and/or angular acceleration of the blade 10 in any direction of interest.

The measurement of accelerations may be used for the calculation of forces and torques acting on the blade 10. As an alternative, force sensors 20 may be also used.

According to the measurement of the sensors 20 the movements of the blade 10 during lifting may be measured both in a horizontal plane orthogonal to the lifting direction Z and in a vertical plane including the pitching axis Y and the lifting direction Z. The movements of the blade 10 during lifting depend from the intensity and direction of the wind.

The controller 40 receives the data from the sensors 20 and operates the pitching device 30 in order to minimize the disturbances of the wind during the lifting operation.

According to an embodiment of the present invention, the blade 10 is lifted in a vertical orientation, with the suction and the pressure sides 11, 12 exposed directly to the wind. The controller 40 monitors the blade 10 through the sensors 20 and when the blade 10 moves more than a predefined threshold in the horizontal plane it commands the pitching device 30 to pitch the blade 10 to generate more aerodynamic load on the blade. This causes the blade 10 to become stable again.

According to another embodiment of the present invention, the blade 10 is lifted in a horizontal orientation, with the leading and trailing edges 13, 14 exposed directly to the wind. The controller 40 monitors the blade 10 through the sensors 20 and when the blade moves more than a predefined threshold in the vertical plane it commands the pitching device 30 to pitch the blade 10 to generate less aerodynamical load on the blade 10. This causes the blade 10 to become stable again.

The predefined thresholds may be defined as values of linear or angular oscillations, and/or of speeds and/or of acceleration in a section, or in more than one section of the blade 10.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The claims are as follows:

1. A lifting device for a wind turbine component comprising:
   a yoke for connecting the wind turbine component to a crane, the yoke including at least one sensor for measuring at least one of the position, the speed, and the acceleration of the wind turbine component at least during a lifting operation of the component,
   wherein the yoke further includes a pitching device for rotating the wind turbine component around a pitching axis when the wind turbine component is connected to the yoke,
   wherein the lifting device further includes a controller for controlling the rotation of the pitching device around the pitching axis as a function of the measurement of the at least one sensor;
   wherein the wind turbine component is a blade for a wind turbine, and
   wherein the pitching device is configured for rotating the blade between a first position wherein the suction and pressure sides of the blade are vertically oriented and a second position wherein the suction and pressure sides of the blade are horizontally oriented as the blade is lifted.

2. The lifting device according to claim 1, wherein the at least one sensor is positioned and oriented on the yoke, in order to measure the position and/or the speed and/or the acceleration of the yoke along a lifting direction and/or a plane orthogonal to the lifting direction.

3. The lifting device according to claim 1, wherein the yoke is dimensioned and configured in such a way that the pitching axis is inclined of an angle comprised between 0 and 60 degrees with respect to a horizontal direction.

4. The lifting device according to claim 3, wherein the yoke is dimensioned and configured in such a way that the pitching axis is horizontally oriented.

5. The lifting device according to claim 1, wherein the yoke including a plurality of sensors for measuring at least one of a position, a speed and, the acceleration of at least two points of the wind turbine component.

6. A method for lifting a component, wherein the component is a blade for a wind turbine, the method comprising the steps of:
   providing a lifting device for the component, the lifting device having a yoke for connecting the component to a crane, the yoke including at least one sensor for measuring at least one of the position, the speed, and the acceleration of the component at least during a lifting operation of the component, wherein the yoke further includes a pitching device for rotating the component around a pitching axis when the component is connected to the yoke, wherein the lifting device further includes a controller for controlling the rotation of the pitching device around the pitching axis as a function of the measurement of the at least one sensor, wherein the pitching device is configured for rotating the blade between a first position wherein the suction and pressure sides of the blade are vertically oriented and a second position wherein the suction and pressure sides of the blade are horizontally oriented as the blade is lifted;
   lifting the component,
   measuring the position and/or the speed and/or the acceleration of the component during the lifting step, and
   rotating the component around the pitching axis depending on the position and/or the speed and/or the acceleration detected in the step of measuring.

7. The method according to claim 6, wherein in the step of rotating the component a suction or a pressure side of the blade is exposed to the wind.

8. The method according to claim 6, wherein in the step of rotating the component a leading or a trailing edge of the blade is exposed to the wind.

9. The method of claim 6, wherein when the blade moves more than a predefined threshold in a horizontal plane, the component is rotated to pitch the component to generate more aerodynamic load.

10. The method of claim 6, wherein wherein when the blade moves more than a predefined threshold in a vertical plane, the component is rotated to pitch the component to generate less aerodynamic load.

\* \* \* \* \*